Sept. 27, 1932.  A. F. H. KOHLER ET AL  1,880,177
ADAPTER FOR VALVES
Filed Aug. 20, 1931
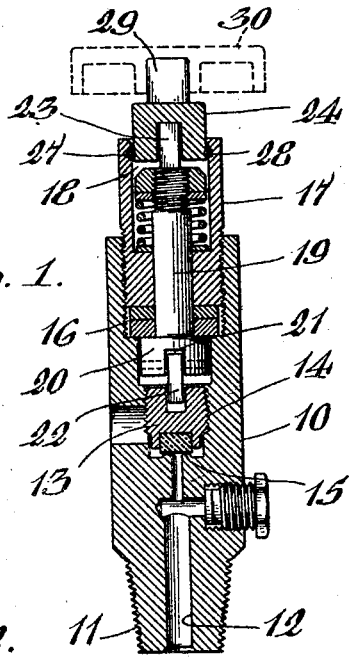
Fig. 1.
Fig. 2.
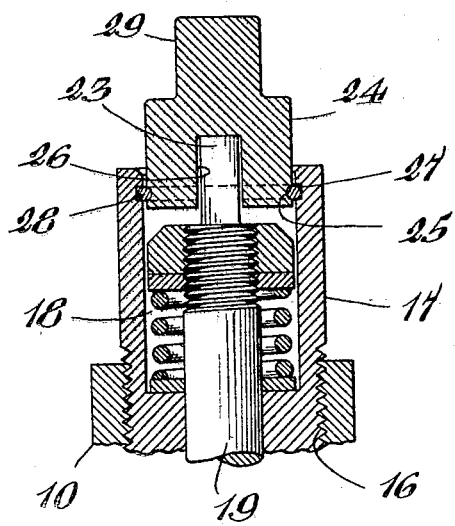
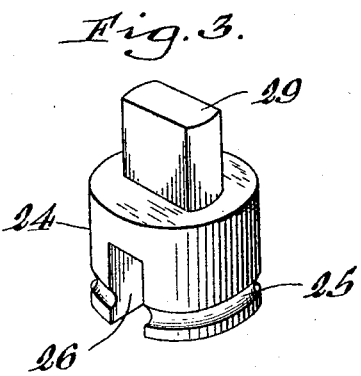
Fig. 3.
Fig. 4.
Inventors,
August F. H. Kohler,
Arthur C. Kautz,
by Walter P. Geyer
Attorney.

Patented Sept. 27, 1932

1,880,177

UNITED STATES PATENT OFFICE

AUGUST F. H. KOHLER AND ARTHUR C. KAUTZ, OF LOCKPORT, NEW YORK; SAID KAUTZ ASSIGNOR TO SAID KOHLER

ADAPTER FOR VALVES

Application filed August 20, 1931. Serial No. 558,249.

This invention relates to a valve adapter or fitting designed primarily for use with the valves of high pressure gas cylinders of the type used in hospitals, dental offices, etc.

The valve stems of the so-called packless valves now generally employed on the portable gas cylinders intended for surgical use are smaller than the valve stems of the packed type of valve formerly generally employed on such cylinders. The dimensions of the packless valves are limited by reason of the size of the appliances used in connection therewith, and so it became necessary to employ a smaller diameter valve stem in the packless valves in order to provide a shoulder on the valve stem of sufficient area to form a seal for the packless valve. The reduction in diameter of the valve stem of the packless valve results in the disadvantage that valve wrenches and hand-wheels employed on the packed type of valve do not fit the new packless valves.

It is an object of the present invention to provide an adapter which may be employed in connection with a valve of the packless type to adapt the valve stem thereof to fit the valve wrench or hand-wheel heretofore employed for the packed type of valve.

Another object is the provision of a valve adapter which is separable from the valve stem and is yieldably held in operative position.

Other objects will be apparent from a consideration of the following description taken in connection with the annexed drawing, wherein:—

Figure 1 shows a longitudinal section of a packless valve showing the adapter applied thereto. Figure 2 is a similar view, on an enlarged scale, of the upper portion of the valve and adapter. Figure 3 is a perspective view of the adapter. Figure 4 is a perspective view of the resilient ring.

Similar characters of reference indicate corresponding parts throughout the several views.

The invention is shown in connection with a packless valve of the type particularly adapted for use with gas cylinders, the same including a valve body 10 which is threaded at its lower end, as indicated at 11 to permit its attachment to a compressed gas cylinder. The valve passage 12 is closed by a retractible plug 13 which is threaded into a corresponding recess 14, so that turning of the plug in its recess moves the plug into or out of engagement with its seat 15. A counter recess 16 is formed in the outer end of the valve body 10, within which is threaded the packing gland 17 having a socket 18 formed in its outer end. A valve stem 19 extends through the packing gland and terminates at its inner end in an enlarged portion or head 20 having a diametrically disposed slot 21 therein within which is keyed a suitable tang 22 that forms an operative connection between the valve stem 19 and the valve plug 13. From the foregoing, it will be apparent that rotation of the valve stem is transmitted to the valve plug through the tang 22, causing the plug to move into or out of engagement with its seat 15 to open or close the valve. The valve stem 19 does not move longitudinally, but the plug 13 is free to move lengthwise relative thereto to its open and closed positions. At its upper end said stem has a lug 23 rising therefrom.

The adapter which is arranged to be detachably connected to the valve-stem lug 23, consists of a body portion 24 shaped to fit into the socket 18 of the packing gland 17 and has a circumferential groove 25 therein adjacent its lower end and a recess 26 formed in its bottom to receive the valve-stem lug 23. Within the socket 18 near its upper end is formed an internal circumferential groove 27 adapted to receive a split annular expansion spring 28 normally seated in the adapter-groove 25. In operative position, the spring is expanded within the conjugate grooves 25 and 27 to hold the adapter in place. A lug 29 of suitable shape to fit a standard wrench or hand wheel 30 is formed on the outer end of the adapter, whereby it may be conveniently operated.

To assemble the adapter and valve, the annular spring 28 is applied to the adapter-groove 25, after which the adapter is inserted into the socket 18 of the packing gland 17 with its recess 26 registering with the companion lug 23 rising from the valve-stem 19. When the spring is in juxtaposition to the groove 27 in the packing nut socket, it will expand into the same to hold the adapter in operative engagement with the valve-stem and prevent its displacement from the packing nut.

While this adapter is manifestly simple and inexpensive in construction, it permits the valves of various types used on portable gas cylinders to be readily adapted for operation by the standard hand wheels employed for controlling them, thereby saving the time of hospital attendants, doctors, etc., in the use of the gas cylinders.

We claim as our invention:—

1. In combination with a valve including a body having a socket and a valve-stem extending into the same and terminating at its end in an operating lug, an adapter for the stem having a body portion shaped to fit the socket and having a recess in its bottom for engagement with the valve-stem lug, a lug at the opposite end of said adapter, and resilient means for detachably connecting the adapter to the socket of the valve-body.

2. In combination with a valve-body having a socket at its upper end containing an internal annular groove and a valve-stem extending into the socket, of an adapter for the valve-stem having a body portion shaped to fit the socket and having a corresponding annular groove therein and a recess at its lower end for engagement with the valve-stem and an expansible band seated in the groove of the adapter-body for detachable interlocking engagement with the companion groove of the valve-body socket, said adapter-body having a lug rising therefrom for actuating the valve-stem.

3. An adapter for the operating stems of valves, comprising a body portion shaped to fit a valve-body socket and having a recess therein to receive the operating end of the valve-stem, a lug formed at the opposite end of said body portion, and an anchoring element applied to said body portion for detachably connecting it to said valve-body socket.

4. A valve structure of the character described, comprising a body, a valve-stem and a packing gland in its upper end, said gland containing a socket into which said stem projects, said socket having an internal annular groove therein, an adapter for the valve stem detachably fitted in said socket and having a recess in its bottom for interlocking engagement with the valve-stem and an annular groove adjacent its lower end, and a split annular expansible wire seated in said adapted groove for detachable interlocking engagement with the companion groove in the packing gland.

AUGUST F. H. KOHLER.
ARTHUR C. KAUTZ.